United States Patent [19]

Auguste Leveau

[11] 3,884,320
[45] May 20, 1975

[54] SELF-DRIVEN MACHINE, WITH DIFFERENTIAL STEERING

[76] Inventor: Raymond Louis Auguste Leveau, 175 Boulevard Murat, 75016 Paris, France

[22] Filed: July 30, 1973

[21] Appl. No.: 383,608

[30] Foreign Application Priority Data
July 31, 1972 France .................. 72.27519

[52] U.S. Cl. ...................... 180/79.2 C; 280/91
[51] Int. Cl. ........................... B62d 49/00
[58] Field of Search ........... 180/79.2 R, 79.2 C, 45; 280/91

[56] References Cited
UNITED STATES PATENTS

| | | | |
|---|---|---|---|
| 2,715,534 | 8/1955 | Hoge | 280/91 X |
| 3,306,390 | 2/1967 | Jamme | 280/91 X |
| 3,532,178 | 10/1970 | Lindbom | 180/79.2 C |
| 3,572,459 | 3/1971 | Nieminski | 180/79.2 R |
| 3,696,881 | 10/1972 | Gordon | 180/79.2 C X |

Primary Examiner—Robert B. Reeves
Assistant Examiner—Thomas E. Kocovsky
Attorney, Agent, or Firm—Holman & Stern

[57] ABSTRACT

The chassis of the machine has an irregular H shape in plan and has two parallel longitudinal members whose rear ends are connected to the differential of the rear wheels and whose front ends are fixed to a centre hollow cross-member. Two hollow lateral branches are connected to the cross-member to form a yoke which extends over the whole of the width of the machine and within which yoke may be secured working equipment. The essential parts of the steering mechanism are contained inside the cross-member and the branches and are so arranged as to permit a differential orientation of the steering wheels so that, in the extreme steering position, the machine has a turning circle radius equal to the track of the vehicle wheels.

18 Claims, 9 Drawing Figures

SELF-DRIVEN MACHINE, WITH DIFFERENTIAL STEERING

The present invention relates to a self-driven machine capable of receiving working equipment or tool, for example for agricultural use, which is driven by the engine of the machine.

Conventional tractors satisfy only imperfectly the requirements of the mounting and use of the equipment coupled thereto whether the equipment be drawn along or carried by the three-point system of the tractor. Indeed, the equipment or tool remains somewhat exterior to the tractor and is not integrated therein which has for consequence that the assembly comprising the tractor and working equipment is not completely adapted to the desired function of the equipment. This is the reason why the specialized self-driven machines are in increasing use in agriculture; but this evolution of the art is still unsatisfactory from the point of view of price, since a specialized machine is active during only a limited period of the year, which represents a very heavy overhead for the cultivators.

An object of the present invention is to remedy this situation and provide a self-driven machine having a universal use and in which the very diverse working equipment and tools may be integrated under conditions which allow them to fully perform their function.

The invention provided a self-driven machine comprising an engine unit disposed in the vicinity of the rear differential and two front steering road wheels, wherein a chassis element which forms in the front a yoke having a cross-member which extends substantially throughout the width of the machine and branches which support the respective front road wheels which are connected to a steering mechanism contained in the cross-member and the branches of the yoke so that the latter defines a wholly free space in the front for receiving working equipment.

This equipment, which may of course be operatively connected to a power take-off of the engine unit, may be fixed to the cross-member of the yoke or on the branches of the latter by simple means which do not require substantial modifications to the component parts of the machine. The branches of the yoke may moreover have a variable angular position so that they may adapt themselves to the type of equipment employed and are lockable in the required position.

The self-driven machine has a small overall size and it is moreover very easy to manoeuvre in that its turning circle is very small and may be, in the extreme case, equal to the wheelbase owing to an additional arrangement in which the steering mechanism is so arranged as to permit a differential orientation of the two steering road wheels whereby it is possible for example to orient one of the steering wheels at 90° whereas the other wheel has the required inclination so that the steering occurs around a point of contact with the ground of the rear wheel corresponding to the front road wheel oriented at 90°.

This arrangement of the steering mechanism comprises advantageously a drive element mounted in the cross-member which is movable in translation in both directions and connected through a differential system to one of the ends of two flexible transmission means, the other end of which controls an orienting device associated with the corresponding steering road wheel.

The differential system comprises at least one connecting means pivoted to the drive element, connected to one or each of the flexible transmission means and provided with a roller or the like engaged in a fixed guide groove or slot whose profile is such that it is capable of imparting to the connecting means an angular movement about its pivot under the effect of which the flexible means or each flexible means effects a travel of length different from that of the drive element.

The drive element is constituted for example by the moving part of a double acting hydraulic cylinder device the actuation of which is controlled by the steering column of the machine.

There may be provided two guide grooves or slots and two corresponding connecting means each of which is constituted by an arm having one end carrying a roller engaged in the associated groove or slot and another end which is pivoted to the drive element and comprises a tooth engaged with a rack slidable in a direction parallel to the drive element to which the adjacent end of the corresponding flexible means is secured. In this case the two flexible transmission means are normally in the extension of each other and this reduces the overall size of the mechanism in the cross-member of the yoke.

When it is possible to dispose the flexible transmission means by offsetting them from each other, there may be provided a single connection means directly connected to the respective flexible means at two points disposed on each side of the pivotable connection to the drive element. In this case, the connecting means is advantageously constituted by a triangular plate on one of the corners of which is mounted one of the rollers guided in the groove or slot.

The guide slot or groove or each one thereof constitutes somewhat a cam with which co-operates the counter-cam constituted by the roller carried by the connecting means or each connecting means. The law or orientation of the respective steering road wheels in accordance with the amplitude of the rotation imparted to the steering wheel of the machine is of course related to the precise profile given to this cam or these cams which must be chosen in accordance with the nature of the working equipment integrated in the machine. It is therefore advantageous that the plate or plates carrying the cam or the cams be interchangeable at will.

The device for orienting each of the wheels may also be of a hydraulic type with utilisation of a directional valve whose slide member is connected to the flexible transmission and which is controlled by a cylinder device whose moving part is integral with a rack engaged with a pinion mounted on the pivot to which an arm supporting the wheel stub-axle is fixed. This rack may be disengaged so as to permit, when changing the angular position of the branches of the yoke, to suitably orient the road wheels.

Further features and advantages of the invention will be apparent from the ensuing description with reference to the accompanying drawings.

Figure 1:
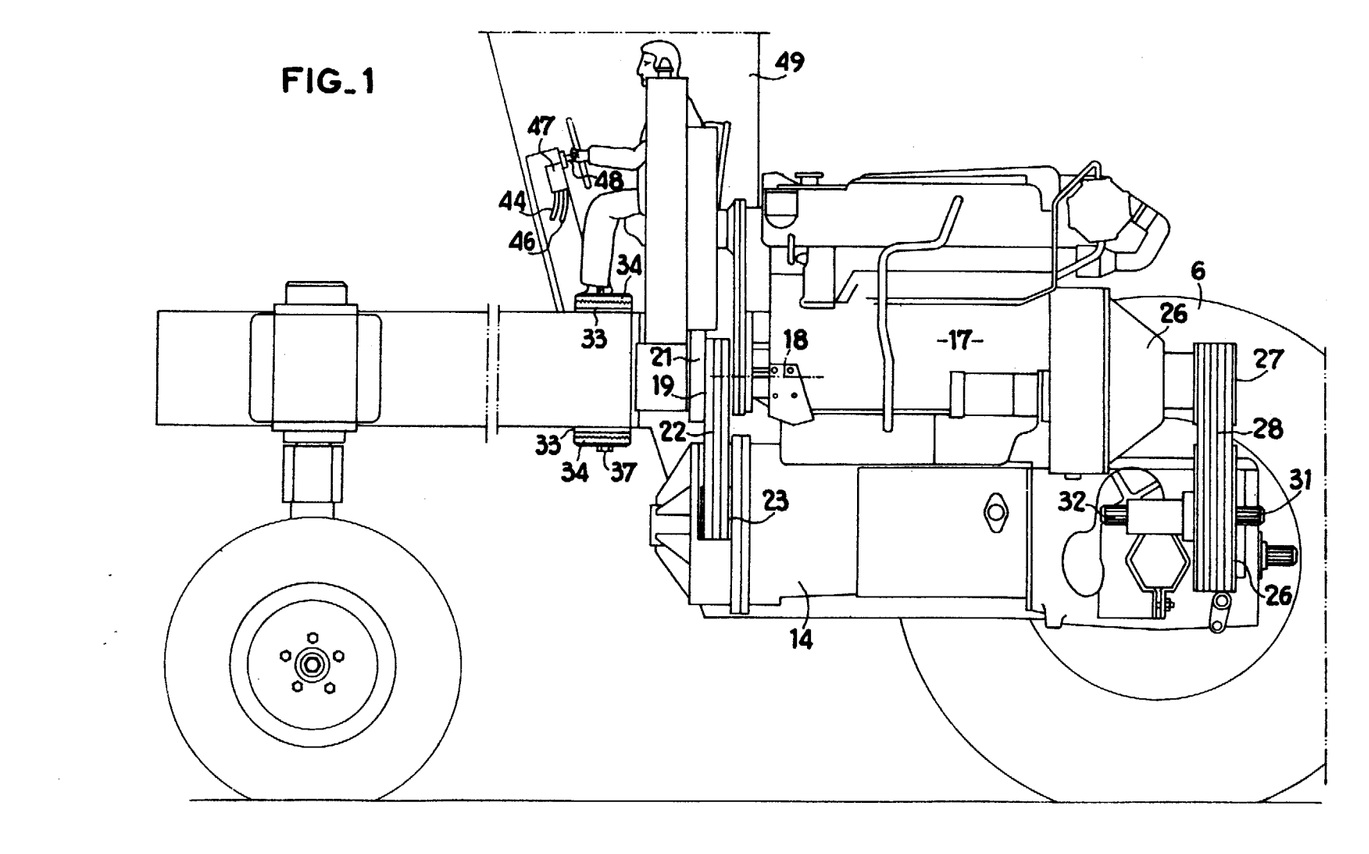
FIG. 1 is a diagrammatic side elevational view of a self-driven machine particularly adapted for agricultural uses.
Figure 2:
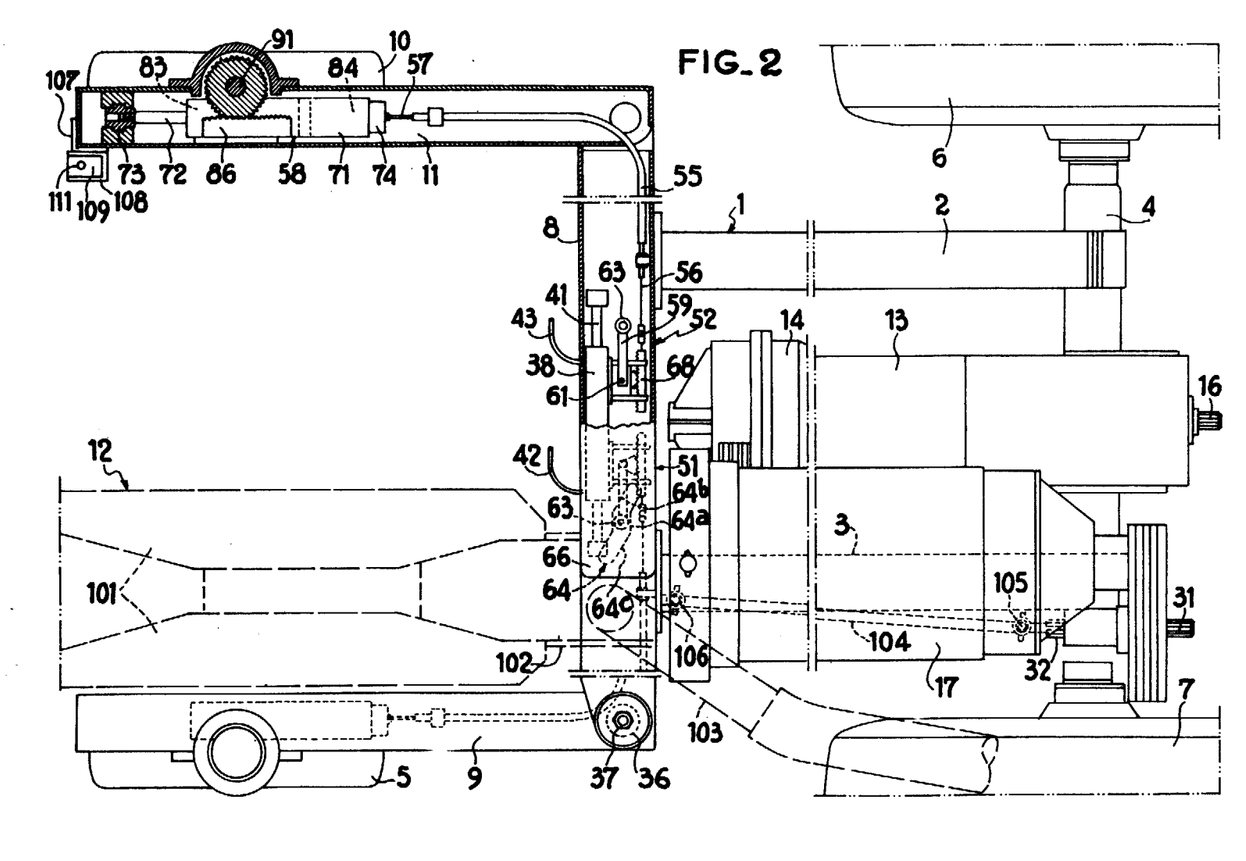
FIG. 2 is a corresponding plan view of the machine with parts cut away.
Figure 3:
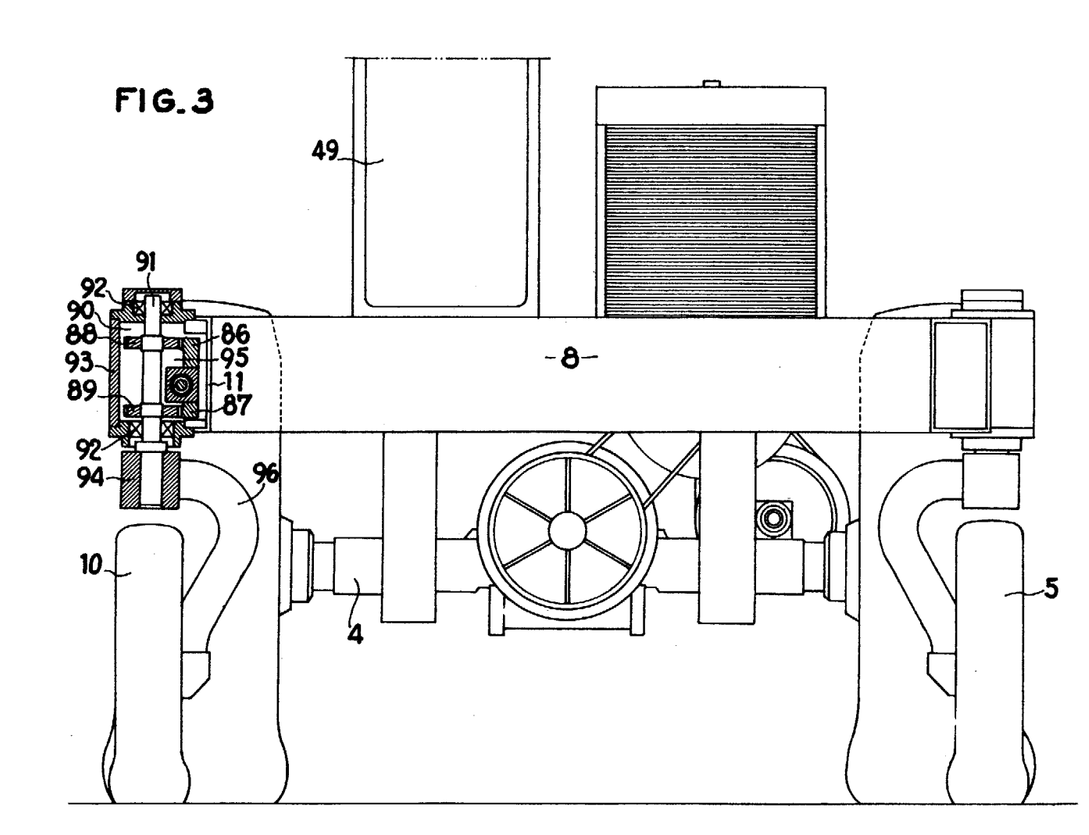
FIG. 3 is a front elevational view, with a part in section, in the region of one of the pivots of the steering road wheels.

The chassis 1 of the self-driven machine shown in FIGS. 1–3 has in plan the shape of an irregular H having two parallel branches constituting longitudinal members 2, 3 the rear end of which is connected to the differential casings 4 supporting the rear drive wheels 6, 7 and the front end of which is fixed to a centre tubular cross-member 8 having a box-shaped section rendered integral with two lateral branches 9, 11 constituting tubular girders having a box-shaped section and supporting the front steering road wheels 5 and 10. The girders 9, 11 define with the cross-member 8 a front yoke which extends throughout the width of the machine and within which may be fixed a working equipment shown diagrammatically in FIG. 2 at 12 in the form of a maize pick-up constituting both a choper and ensiler.

The driving part of the machine is constituted by elements derived from a conventional tractor and in particular by a gearbox 13, a clutch 14 and a power take-off 16 located at the rear of the machine. The engine 17 with its associated parts instead of being placed in front of the gearbox in accordance with the usual arrangement is disposed laterally between the left wheel 17 and the assembly comprising the differential 4 and the gearbox 13. For driving the driving wheels 6, 7, the power take-off shaft 18 extending forwardly of the engine is provided with a grooved pulley 19 combined with a torque limiting device having a trip 21 which drives a belt 22 extending around a pulley 23 which drives the plate of the clutch 14. A clutch 26 provided at the rear of the engine 17 may drive a grooved pulley 27 around which extends a belt 28 which transmits the power from the engine through a pulley 29 to two splined shafts 31, 32 constituting power take-offs respectively extending rearwardly and forwardly.

The connection between the girders 9, 11 constituting the branches of the front yoke and the cross-member 8 of the latter is such that these girders may have a variable angular orientation. For this purpose, the ends of the cross-member 8 have cylindrical bosses 33 on which are applied discs 34 which are toothed or notched so as to permit identification of their angular position, the assembly being capable of being locked in the chosen position by means of a screwthreaded pin 36 and nut 37.

As can be seen clearly in FIG. 2, the essential parts of the steering mechanism are contained inside the cross-member 8 and the branches 9, 11 of the front yoke. A drive element, constituted by the body 38 of a double-acting cylinder device 39 whose rod 41 is fixed to the cross member 8 and which is supplied with hydraulic fluid by way of conduits 42, 43 connected at 44 and 45 to a rotary directional valve 47 which is actuated by the steering column 48 disposed in the control cabin 49, is connected by two devices having a differential action 51, 52 to one of the ends 53 of the two flexible control means 54, 55 whose other end 57 is connected to a device 58 controlling the orientation of the corresponding steering road wheel 5 or 10.

Figure 4:
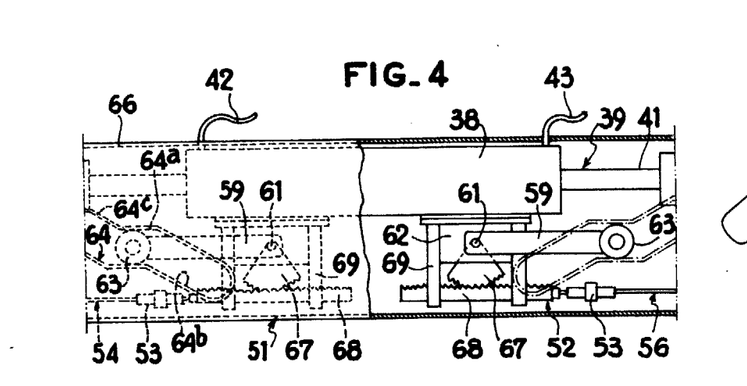
FIG. 4 is a view to an enlarged scale of the main cylinder device of the steering mechanism and its connecting means connecting the flexible wheel control means.

Each device having a differential action comprises an arm 59 having one end pivoted at 61 to a plate 62 integral with the body 38 of a cylinder device and another end carrying a roller 63 engaged in a guide groove or slot 64 formed in a fixed plate 66. Secured to or formed on the end of the arm 59, pivoted at 61 to the body 38 of the cylinder device, is a toothed sector 67 engaged with a rack 68 which is guided in translation in a direction parallel to the cylinder device 39 by two side walls 69 fixed to the body of the cylinder device 38.

The flexible control means 54, 56 are normally constituted by a cable slidably mounted in a sheath 55 of the known type operating under compression and tension.

Figure 5:
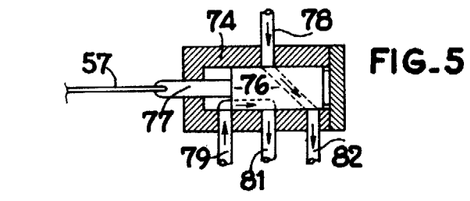
FIG. 5 is a diagrammatic view of the directional valve of each of the cylinder devices controlling the steering.

Each device 58 controlling the orientation comprises a cylinder device whose body 71 is movable and whose rod 72 is fixed at 73 in a block integral with the corresponding branch 9 or 11 of the yoke. A directional valve 74 integral with the body 71 comprises a slide 76 connected by a rod 77 to the adjacent end 57 of the control cable 54 or 56. The case of the directional valve has a port 78 connected to the delivery side of a hydraulic pump and ports 79, 81, 82 respectively communicating with the front chamber 83 of the body 71, the tank of the pump and the rear chamber 84 of the body of the cylinder device.

In the illustrated position, communication is established between the delivery of the pump and the front chamber of the cylinder device 83. In its centre position (not shown), the slide 76 cuts off any communication between the pressure supply port 78 and the outlet ports 79, 81, 82, whereas in the extreme opposite position (not shown), communication is established between the port 78 and the rear chamber 84 of the body 71 of the cylinder device.

The body 71 is integral with two racks 86, 87 which are engaged with gears 88, 89 respectively, fixed on a pivot 91 which is journalled by rolling bearings 92 in a housing 93 which is integral with the girder 9 or 11 and has a lower end secured to a sleeve 94 integral with a swan-neck shaped arm 96 which supports the stub-axle of the corresponding steering road wheel 5 or 10. Two free spaces 90, 95 are formed on each side of the upper gear 88 to permit the disengagement of the racks from the associated gears for changing the angular position of the branches 9, 11 of the yoke. The racks are re-engaged after the correct positioning of the steering road wheels. For this positioning, the teeth of the bosses 33 and discs 34 are identical.

When, for example, the cable 56 is displaced in one direction, which causes the slide 76 to slide inside the valve 74, communication is established, as shown in FIG. 5, between the delivery side of the pump and, through the port 98, the front chamber 93 of the body 71. There is consequently a movement toward the left of the body 71 of the cylinder device as viewed in the drawing which, by means of the racks 86, 87 rotates the steering road wheel 10 about the axis of its pivot 91. In view of the fact that the valve 74 is integral with the body 71, the housing of the directional valve is driven in translation to a position which returns the slide 76 to the centre position which is a position of equilibrium and which can only be once more modified by a new pulse applied to the steering column 48.

The guide grooves 64 constitute profile cams which include a rectilinear portion 64a parallel to the line of action of the cylinder device 39 and two inclined portions 64b, 64c disposed on each side of the rectilinear portion 64a and having opposite orientations. When the cylinder device 39 is actuated and the rollers 63 remain in the rectilinear portion 64a of the guide cam 64, it is clear that the arms 59 maintain their orientation parallel to the cylinder device 39 so that everything occurs as if the racks 68 were integral with the body 38 of the cylinder device and that thus the travel effected by the two cables 54 and 56 are equal to each other and equal to the travel of the body 38. Consequently the wheels 10 undergo an angular movement of equal amplitude under the action of the valve 74. If on the other hand the roller 63 engages in one or the other of the inclined portions 64b, 64c of the guide cam 64, the arm 59 pivots and this results in an angular movement of the corresponding toothed sector 67 and consequently in a linear displacement of the rack 68 which is added to the rectilinear displacement due to the movement of the body 38 or subtracted therefrom.

Figure 6:
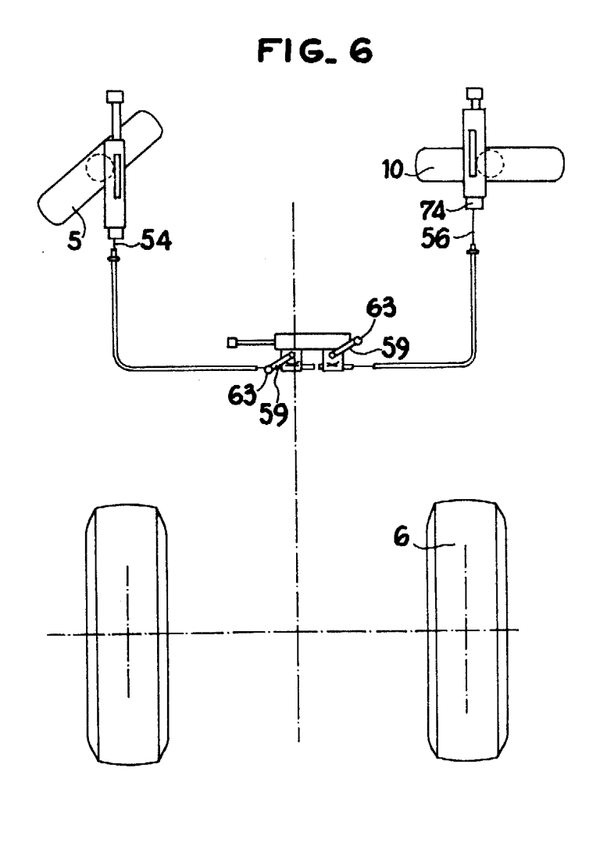
FIG. 6 is a diagrammatic plan view of the orientation of the steering road wheel in a position which affords a turning circle having a radius equal to the wheelbase.

In the diagram shown in FIG. 6, the two arms 59 have pivoted to their extreme position in the clockwise direction, the right roller 63 being engaged fully in the inclined portion 64c of the associated cam 64 and the left roller 63 being at the end of the inclined portion 64b of the corresponding cam 64.

The profile of the cams may be such that, as shown, the differences in the travel between the cables 64 and 66 constrain the right steering road wheel to assume a position oriented at 90° whereas the left steering road wheel assumes an inclined position which corresponds to the tangent of the circle having for centre the point of contact with the ground of the right rear wheel 6. The machine has under these conditions a turning circle equal to its wheelbase.

The harvester-chopper shown by way of example in FIG. 2 comprises in the conventional manner two cutting means each of which includes two pick-up noses 101 and a case 102 in which are disposed a cutter rotor and a cam which discharges the cut fodder in a passage 103 which is connected to an ejector provided for discharging the cut product into a bucket coupled to the rear of the machine.

The harvester-chopper is driven for example by a shaft 104 having a double universal joint 105, 106 of which the joint 105 is connected to the power take-off 32. The harvester-chopper is fixed to the front yoke at three points of which one (not shown) is located at the centre of the cross-member 8 and the others are constituted by brackets mounted in front of the girders 9, 11 and including a L-sectioned member 107 to which is secured a U-sectioned member 108 including a web 109 in which is provided an aperture 111 for the passage of a fixing pin which normally extends through the connecting bar (not shown) of the harvester-chopper.

Figure 7:
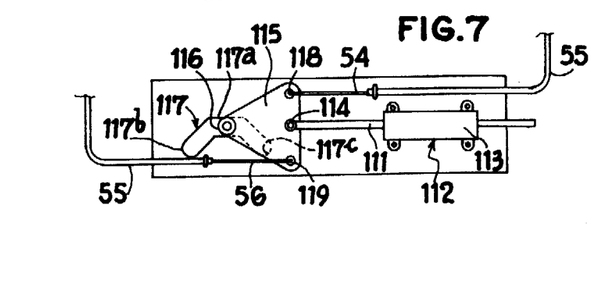
FIG. 7 is a diagrammatic view of a modification of the assembly comprising the main cylinder device controlling the steering and its connections with the flexible steering means.

FIG. 7 shows a modification of the steering mechanism in which the drive element is constituted by the rod 111 of a cylinder device 112 whose body 113 is fixed to the cross-member 8. The free end of the rod 111 is pivoted at 114 to the centre of the base of a triangular connection plate 115 whose corner opposite the pivot or connection 114 carries a roller 116 engaged in a guide groove 117 constituting a cam. On each side of the pivotal connection 114 and in alignment therewith, there are provided two attachment points 118, 119 for the respective control transmission cables 54, 56 engaged in the sheaths 55. The cam 117 has a short centre rectilinear portion 117a in the extension of the rod 111 and two symmetrically oriented inclined portions 117b, 117c.

So long as the movements of the roller 116 due to the movement of the rod 111 occur in the rectilinear portion 117a, the travels of the two cables 54, 56 are equal and the angular displacements of the steering wheels 5, 10 are of equal amplitude. When the roller enters one of the inclined branches of the cam, for example branch 117b, it undergoes a sliding which constrains the plate 115 to pivot in the counterclockwise direction (FIG. 7) so that the cable 54 undergoes an increased travel with respect to the travel of the rod of the cylinder device whereas the other cable 56 undergoes a reduction in the travel so that the steering road wheels 5, 10 undergo an unequal pivotal movement.

Figure 8:
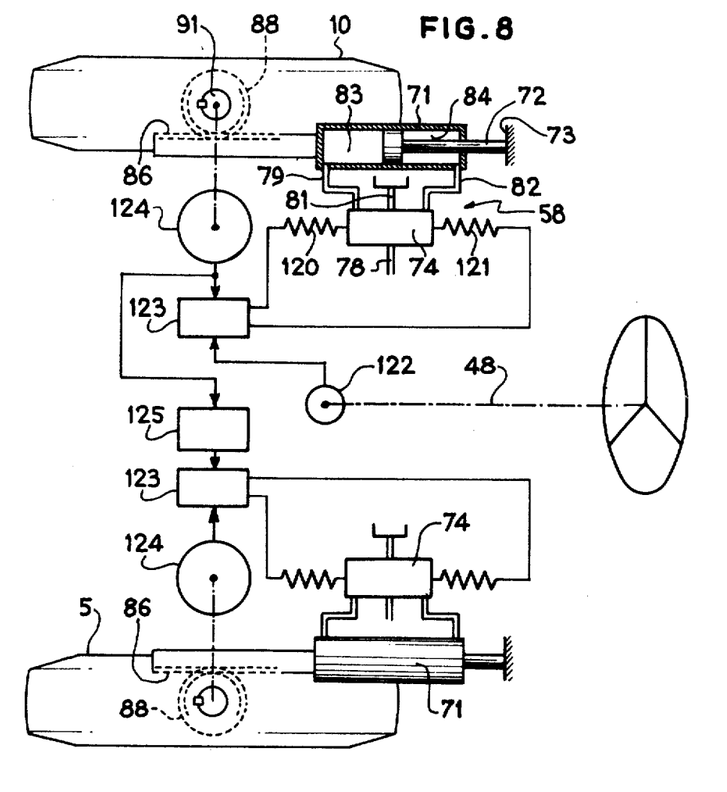
FIG. 8 is a diagrammatic view of an electronic control system of the steering road wheels of the machine shown at FIG. 1.

The electronic system of FIG. 8 includes, for each of the steering road wheels 5, 10 of the machine a device 58 controlling the orientation, the component parts of which are the same as those of the corresponding device 58 shown at FIG. 2. Accordingly, the same reference numerals are given to the parts of the system corresponding to those of this device 58.

But instead of being driven mechanically as described by reference to FIG. 2, the device 58 controlling the orientation is operated by electronic means which will be described hereinafter.

In the present embodiment, the directional valve 74 is an electromagnetic valve the slide of which (not shown) is actuated in opposite directions by two electromagnetic coils 120 and 121.

The electronic system further includes a pulse generator such as an angular sensor 122 mechanically coupled to the steering column 48. The output of the angular sensor 122 is electronically connected to one input of an electronic servo 123 comprising another input to which is connected the output of a detector 124, such as an angular sensor, which is mechanically coupled to the pivot 91 of the wheel 10. The angular sensor 122 is provided for supplying to the servo 123 pulses corresponding to the angular motion of the steering column 48 to be transmitted to the right wheel 10 and corresponding to the demand of the operator. The angular sensor 124 is provided for supplying to the servo 123 pulse trains corresponding to the acutal orientation of the wheel 10.

Two outputs of the servo 123 are respectively connected to the coils 120 and 121 which control the valve 74. Means corresponding to the servo 123 and angular sensor 124 are also provided for controlling coils 120 and 121 of the electromagnetic valve 74 which actuates the cylinder of the left steering road wheel 5. The output of the right angular sensor 124 is also connected to the input of a small computer 125 the output of which is connected to the left servo 123.

The purpose of this computer is to deliver to the left servo pulse trains corresponding to the orientation to be given to the left wheel 5 related to the orientation of the right wheel 10.

Figure 9:
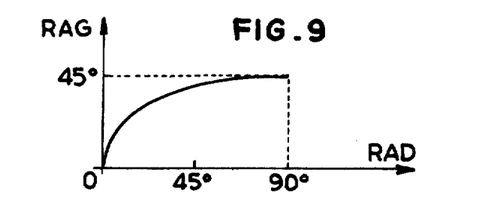
FIG. 9 shows a curve representing the angular positions of the left steering road wheel relative to the right steering road wheel, to be generated by the computer of the system shown at FIG. 8.

An example of function of the orientation of the left wheel 5 related to that of the right wheel is illustrated by the curve shown at FIG. 9 wherein the orientations of right and left wheels are indicated in abscissae and ordinates respectively.

The computer 125 is adapted to generate any function of the type shown at FIG. 9, as the basis of a selected program which corresponds to particular steering conditions required for the machine.

When the steering column 48 is rotated by the operator, the angular sensor 122 supplies to the servo 123 a train of pulses corresponding to the orientation demand for the wheel 10.

Simultaneously, the angular sensor 124 supplies to the servo 123 a pulse train corresponding to the actual orientation of the wheel 10. These two signals are combined in the servo 123 and whether the actual position signal is greater or less than the demand signal, a signal appears at one of the output of the servo for actuating either coil 120 or coil 121 and the chambers 83 or 84 is supplied with fluid and the cylinder 71 and consequently the rack 86 is moved in the suitable direction to rotate the wheel 10 about its pivot 91 into the position required by the demand signal.

When the required orientation is reached, the signals from sensors 122 and 124 become equal and there is no signal at the outputs of the servo 123 so that the valve 74 is closed and the cylinder 71 is held in position.

The output from the angular sensor 124 is also applied to the computer 125 which, according to the program introduced therein, supplies a train of pulses corresponding to the orientation to be given to the left wheel 5 relative to the orientation of the right wheel 10.

The operation of the different components associated with the left wheel is the same as hereinbefore described for the right wheel.

In the embodiment of FIG. 8, the computer input is connected to the output of the right angular sensor 124, but it is to be noted that the input of the computer may also be connected to the output of the angular sensor 122. In this case, the instructions relative to the orientation of the left wheel would be provided by the computer by processing the data relative to the demand signal thereto by the angular sensor 122.

Having now described my invention what I claim as new and desire to secure by Letters Patent Is:

1. A self-driven machine, in particular for agricultural use, comprising: a chassis, a rear set of wheels, a differential for the rear set of wheels, an engine unit in the vicinity of of the rear set of wheels and differential, a pair of front steering wheels, a chassis element secured to the chassis and defining at the front end of the machine a yoke having a cross-member extending substantially throughout the width of the machine and two branches extending forwardly from and pivotably mounted on the cross-member, the branches respectively supporting the two steering wheels, means for angularly setting the branches relative to the cross-member, and a steering mechanism operatively connected to the steering wheels for orienting the steering wheels in the desired direction and mainly disposed within the cross-member and the branches whereby the yoke defines a space completely free in the front of the machine for receiving working equipment, said steering mechanism comprising a steering control means, a drive element responsive to the control means, an orienting device combined with each of the two steering wheels for changing the orientation of the corresponding wheel relative to a longitudinal axis of the machine transmission means, and a differential system, the drive element being operatively connected to each of the two orienting devices through the transmission means and to at least one of the orienting devices through the differential system, the differential system being operative to render the orientations imparted to the two steering wheels by the drive element through the transmission means and orienting devices different in that, in respect of orientations of the steering wheels other than those in which they are parallel to the longitudinal axis of the machine when the control means for steering the machine is in a neutral position, each wheel is oriented in a direction which is, in plan, tangent to an arc of a circle whose centre coincides with the centre of the turning circle of the machine said differential system including means for modifying the effect of the differential system in accordance with different locations of the wheels resulting from different angular settings of the branches of the yoke.

2. The machine of claim 1, wherein the branches of the yoke are pivotable relative to the cross-member independently of each other.

3. The machine of claim 1, wherein said differential system includes an electronic computer for rendering the orientations of the steering wheels different and said modifying means comprise means for changing the program of the computer.

4. The machine of claim 1, wherein said orienting devices include means for enabling the wheels to be put parallel to the longitudinal axis of the vehicle in said neutral position of said steering control means, when modifying the angular setting of the corresponding branch of the yoke.

5. A self-driven machine, in particular for agricultural use, comprising: a chassis, a rear set of wheels, a differential for the rear set of wheels, an engine unit in the vicinity of the rear set of wheels and differential, a pair of front steering wheels, a chassis element secured to the chassis and defining at the front end of the machine a yoke having a cross-member extending substantially throughout the width of the machine and two branches extending forwardly from the cross-member, the branches respectively supporting the two steering wheels, and a steering mechanism operatively connected to the steering wheels for orienting the steering wheels in the desired direction and mainly disposed within the cross-member and the branches whereby the yoke defines a space completely free in the front of the machine for receiving working equipment, the steering mechanism being capable of achieving orientation of the steering wheels and comprising a drive element mounted in the cross-member, a differential system, transmission means and an orienting device combined with each steering wheel, the drive element being operatively connected to each orienting device through the differential system and the transmission means, the differential system comprising at least one connecting means pivoted to the drive element and connected to one of the transmission means and comprising a roller, a fixed guide means in which guide means the roller is guidedly engaged, the guide means having a profile which is such that the guide means is capable of imparting to the connecting means an angular displacement about its pivotal connection to the drive element which causes the transmission means to travel a distance different to the distance that the drive element travels through.

6. The machine of claim 5, wherein the transmission means comprise flexible cables movable within flexible sheaths.

7. The machine of claim 5, wherein the drive element comprises a moving part of a double-acting cylinder device.

8. The machine of claim 5, comprising two of said connecting means respectively connected to the two transmission means.

9. The machine of claim 5, wherein the guide means is formed in a detachable plate.

10. The machine of claim 5, wherein a single connecting means is employed and is directly connected at two points disposed on each side of the pivotal connection of the connecting means to the drive element to the respective transmission means.

11. The machine of claim 10, wherein the two points of connection to the transmission means and the guided roller are located at corners of a triangle.

12. The machine of claim 5, comprising two guide means and two corresponding connecting means each of which connecting means comprises an arm, a roller carried at an end portion of the arm and engaged with the associated guide means, another end portion of the arm being pivoted to the drive element and defining teeth, and a rack slidable in a direction parallel to the drive element and connected to an adjacent end of the corresponding transmission means, the teeth being engaged with the rack.

13. The machine of claim 12, wherein the drive element comprises a moving part of a double-acting cylinder device and each rack is guided in slideways integral with the cylinder device.

14. The machine in claim 5, wherein each orienting device comprises a control cylinder device and a directional valve associated with the control cylinder device and having a slide to which a corresponding end of the transmission means is connected, the directional valve controlling the control cylinder device.

15. The machine of claim 14, wherein the control cylinder device has a moving part, and there are provided a rack integral with the moving part, a pinion, a pivot, an arm, a steering wheel stub-axle carried by the arm, the arm being secured to the pivot and the pinion being integral with the pivot and meshing with the rack.

16. A self-driven machine, in particular for agricultural use, comprising: a chassis, a rear set of wheels, a differential for the rear set of wheels, an engine unit in the vicinity of the rear set of wheels and differential, a pair of front steering wheels, a chassis element secured to the chassis and defining at the front end of the machine a yoke having a cross-member extending substantially throughout the width of the machne and two branches extending forwardly from the cross-member, the branches respectively supporting the two steering wheels, and a steering mechanism operatively connected to the steering wheels for orienting the steering wheels in the desired direction and mainly disposed within the cross-member and the branches whereby the yoke defines s space completely free in the front of the machine for receiving working equipment, said steering mechanism comprising, associated with each of said steering road wheels, an electronic servo connected to a wheel orientation detector and actuating an electromagnetic directional valve controlling an orienting device, the electronic servo associated with one of said steering road wheels being further connected to a pulse generator mechanically coupled to the steering column of the machine, a computer being provided for receiving information relative to the orientation of said one steering road wheel and for supplying to the electronic servo associated with the other steering road wheel on the basis of a predetermined program, instructions relative to the orientation to be given to said other wheel as a function of information relative to the orientation of said one steering road wheel.

17. The machine of claim 16, wherein each orienting device comprises a control cylinder device controlled by said electromagnetic directional valve.

18. The machine of claim 17, wherein the control cylinder device has a moving part, and there are provided a rack integral with the moving part, a pinion, a pivot, an arm, a steering wheel stub-axle carried by the arm, the arm being secured to the pivot and the pinion being integral with the pivot and meshing with the rack.

* * * * *